United States Patent
Tietze

(10) Patent No.: US 6,170,861 B1
(45) Date of Patent: Jan. 9, 2001

(54) HEAD SIDE GAS BAG RESTRAINT SYSTEM FOR VEHICLE OCCUPANTS

(75) Inventor: Hans-Joachim Tietze, Heubach (DE)

(73) Assignee: TRW Occupant Restraint Systems GmbH & Co. KG, Alfdorf (DE)

(*) Notice: Under 35 U.S.C. 154(b), the term of this patent shall be extended for 0 days.

(21) Appl. No.: 09/144,135

(22) Filed: Aug. 31, 1998

(30) Foreign Application Priority Data

Sep. 13, 1997 (DE) .............................. 297 16 793

(51) Int. Cl.[7] ............................. B60R 21/20; B60R 21/22
(52) U.S. Cl. ................................... 280/730.2; 280/728.2; 280/728.3; 280/751
(58) Field of Search ..................... 280/728.2, 730.2, 280/730.1, 732, 751, 752, 728.3

(56) References Cited

U.S. PATENT DOCUMENTS

| 5,791,683 | * | 8/1998 | Shibata et al. | 280/730.2 |
| 5,836,641 | * | 11/1998 | Sugamoto et al. | 280/751 |
| 5,857,702 | * | 1/1999 | Suga et al. | 280/751 |
| 5,921,575 | * | 7/1999 | Kretshmer et al. | 280/728.2 |
| 5,941,558 | * | 8/1999 | Labrie et al. | 280/728.3 |
| 5,992,914 | * | 11/1999 | Gotoh et al. | 280/751 |

FOREIGN PATENT DOCUMENTS

| 296 03 316 | 8/1996 | (DE) . |
| 0705738 | 4/1996 | (EP) . |
| 2261636 | 5/1993 | (GB) . |
| 07117605 | 5/1995 | (JP) . |
| 10-138861 | * 5/1998 | (JP) . |

* cited by examiner

Primary Examiner—Lanna Mai
Assistant Examiner—Ruth Ilan
(74) Attorney, Agent, or Firm—Tarolli, Sundhiem, Covell, Tummino & Szabo L.L.P.

(57) ABSTRACT

A head side gas bag restraint system for occupants of a vehicle having a vehicle compartment includes a gas bag, a receiving container for the gas bag, which container is to be secured to the vehicle, and an ejection channel for gas bag unfolding in the case of restraint. The receiving container has an outer wall, an inner wall facing the passenger compartment in an installed state of the system, and at least one flap which closes the container in a non-activated state of the system and which swings open in the case of restraint. The channel is formed between the outer and inner walls, the flap having structures arranged thereon. The structures have recesses or cavities and are plastically deformed by the impact of the head of the occupant.

28 Claims, 3 Drawing Sheets

HEAD SIDE GAS BAG RESTRAINT SYSTEM FOR VEHICLE OCCUPANTS

TECHNICAL FIELD

Figure 1:
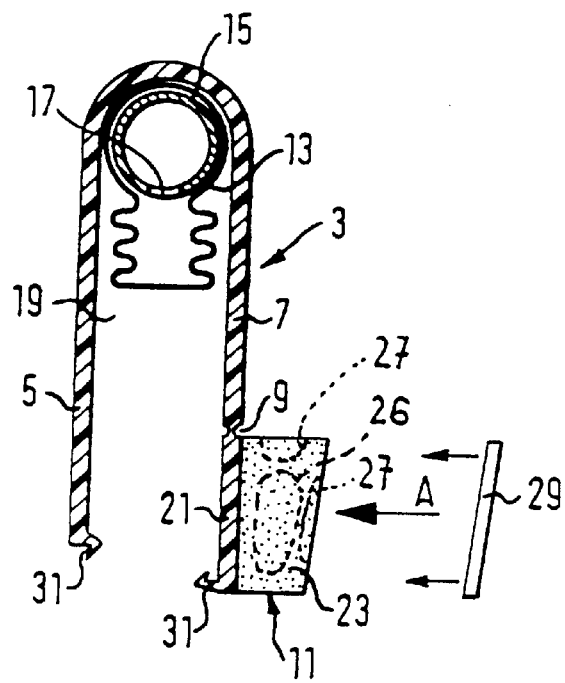

The invention relates to a head side gas bag restraint system for vehicle occupants.

BACKGROUND OF THE INVENTION

A generic gas bag restraint system is known from DE 296 05 896.3. Here, the gas bag is an elongated head gas bag which extends from approximately the A column of the vehicle to approximately the C column. The receiving container, in turn, is a flexible mounting hose into which the folded gas bag is placed. On unfolding, the mounting hose, which is splitted in longitudinal direction, expands and frees the path for the gas bag. A disadvantage to this solution is that no so-called ejection channel is provided, as is known in rigid receiving containers. This ejection channel determines the unfolding direction for the start of the unfolding process. The known rigid containers have either an open or a closed U-shape in cross-section. With the closed U-shape, the container is closed by a flap which is swung open on unfolding of the gas bag. For example by providing limiting straps or stops, the opening angle of the flap can be limited, which makes it possible that not only the inner wall and the outer wall define the ejection channel, but rather in addition also the flap as extension of the inner or the outer wall.

In particular accident situations, it can occur that the gas bag is not unfolded, the occupant, however, hits against the flap or the inner wall of the container. In particular with a container secured to the roof frame, head contact with the container can occur. The containers are in fact usually arranged under a covering of the roof frame, which covering has a thin foam layer, however this covering can not prevent head injuries.

BRIEF SUMMARY OF THE INVENTION

The invention provides a gas bag restraint system, in particular a head gas bag restraint system, which avoids such injuries to the occupant. The head side gas bag restraint system according to the present invention comprises a gas bag, a receiving container for the gas bag, which container is to be secured to the vehicle, and an ejection channel for gas bag unfolding in the case of restraint. The receiving container has an outer wall, an inner wall facing the passenger compartment in an installed state of the system, and at least one flap which closes the container in a non-activated state of the system and which swings open in the case of restraint. The channel is formed between the outer and inner walls, the flap having structures arranged thereon. The structures have recesses or cavities and are plastically deformed by the impact of the head of the occupant.

The wall which is provided between adjacent recesses or cavities and is made of a plastically deformable material may be displaced into the recesses or cavities in the case of a lateral impact, so that a high energy absorbing capacity is provided.

In the gas bag restraint system according to the invention, the flap itself absorbs a portion of the energy of the head, so that the risk of injury can be reduced. The additional padding, hitherto provided, in the region of the covering of the container can be completely dispensed with, so that the special design of the container does not necessarily have to lead to the reduction of headroom, but rather an increase in headroom can even be achieved. The invention not only reduces the risk of injury when the gas bag is not released, but also when it is released, because in the systems hitherto the swung-open flap was able to point towards the occupant and the occupant was able to hit against this flap. A soft flap, however, distinctly reduces the risk of injury in this case as well. Preferably, the ribs are an integral component of the flap, that is, the entire flap including the ribbed structure is designed in one piece. It may thus be produced by foaming or injection-molding, for example.

In the preferred embodiment it is provided for that the flap has a ribbed structure and that the recesses or cavities are provided between the ribs. Since the cavities, which unlike the recesses are closed toward the outside, and the recesses may take any shape, the ribs may accordingly be of any desired geometry. They may, for example, extend linearly or in a curved manner if spherical cavities are provided, to give an example, The notion of a ribbed structure may also include a kind of honeycomb structure.

An important aspect for achieving a high energy absorbing capacity is the orientation of the ribs relative to the direction of force introduction. In fact, the ribs preferably have to extend transversely to the direction of force introduction, in the present case transversely to the direction of the head impact. A plurality of cavities or recesses and ribs should be arranged one after the other in the direction of force introduction, for the ribs to be able to be shifted into the cavities or recesses. If the ribs were oriented in the direction of force introduction, the head of the occupant would simultaneously hit against several ribs in the region of the ends thereof, so that they would have to kink in order to yield plastically.

In accordance with another aspect of the invention, the cavity is formed by injection-molding around a hollow body which is inserted in the flap. This is a very cost-effective manufacturing variant.

According to the invention, the specific structure of the flap and the orientation thereof in relation to the direction of force introduction permit a maximum deformation path which corresponds to almost the entire width of the flap and thus the distance between the inner and outer walls. This is in particular the case when not only the flap is constructed so as to be flexible and energy-absorbing, but also the entire container is deformable by the inner wall being deformable elastically or plastically up to abutment against the outer wall, whereby even more energy can be absorbed.

Since the container can also extend in a curved manner, it is advantageous if several flaps are provided arranged one after another, by which an easy closing and opening of the flaps is ensured.

DETAILED DESCRIPTION OF THE DRAWINGS

Figure 2:
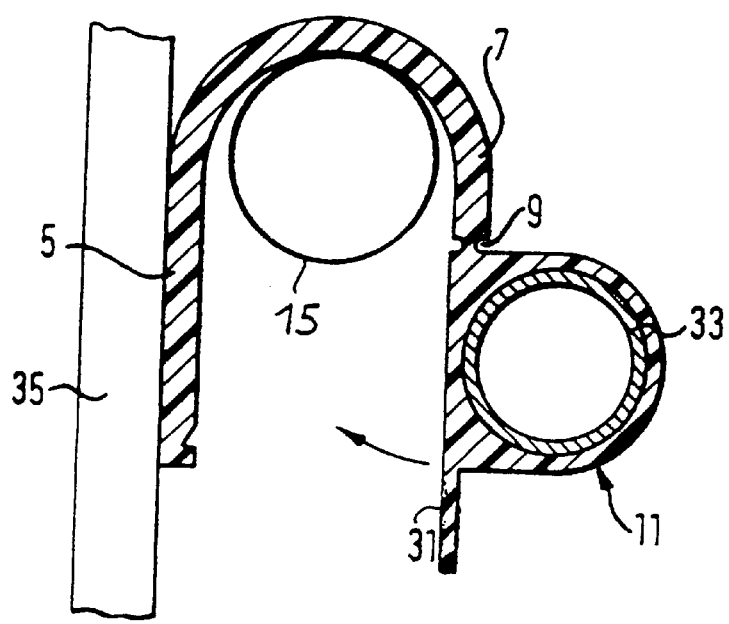
Figure 3:
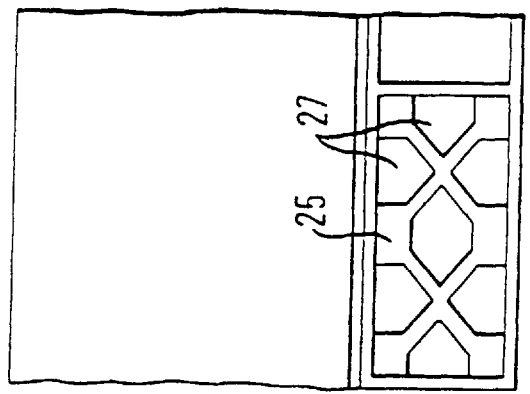
Figure 4:
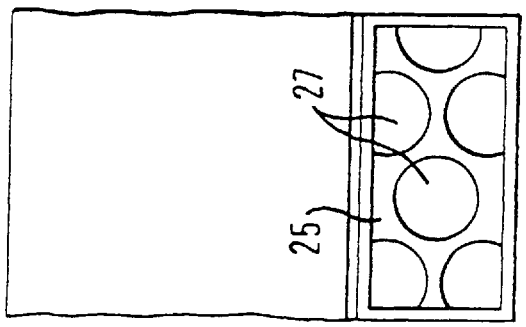
Figure 5:
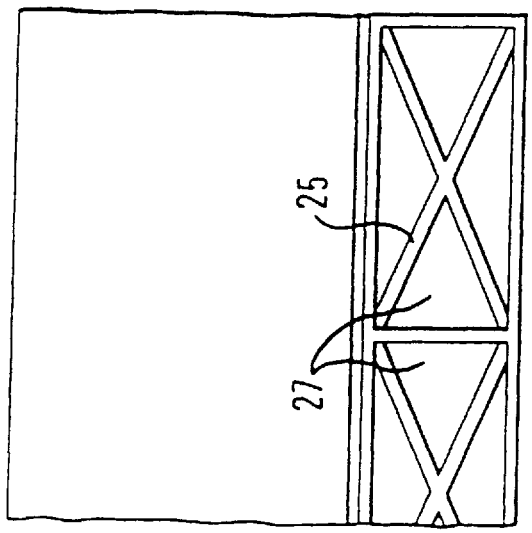
Figure 6:
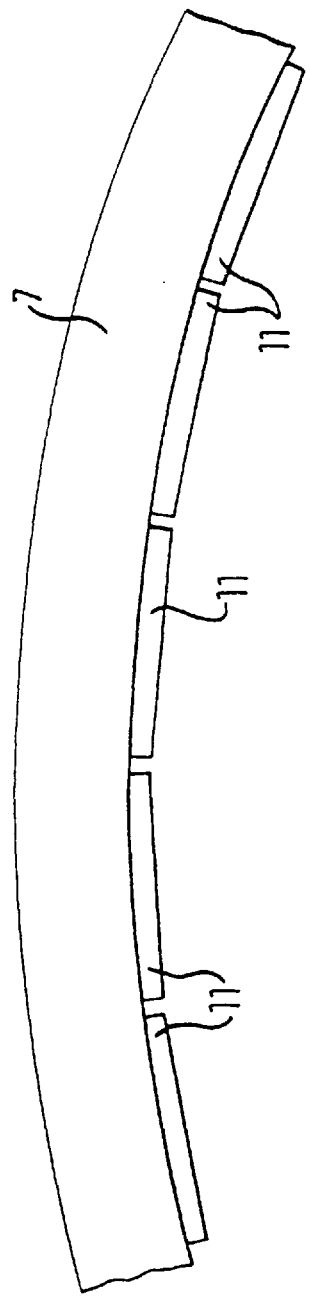
Figure 7:
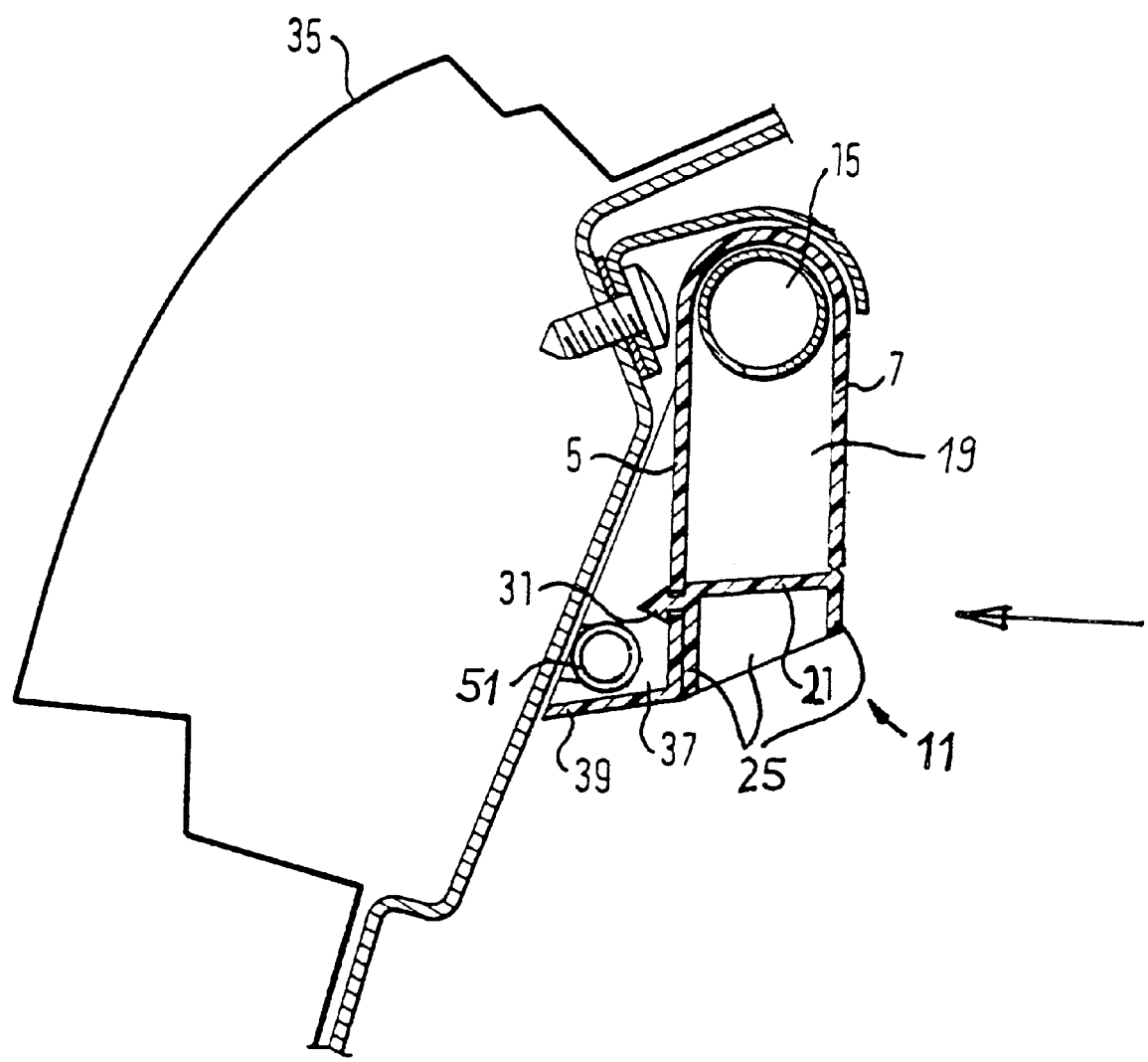

FIG. 1 shows a cross-sectional view through a first embodiment of the gas bag restraint system according to the invention, which is constructed as a head gas bag restraint system, FIG. 2 shows a cross-sectional view through a second embodiment of the gas bag restraint system according to the invention, likewise constructed as a head gas bag restraint system, FIGS. 3 to 5 show various embodiments of the flap of the receiving container according to view A in FIG. 1, with the flaps opened, FIG. 6 shows a side view of the closed receiving container for the head gas bag, with the receiving container having the cross-section shown in FIG. 1, and FIG. 7 shows a cross-sectional view through a further embodiment of the gas bag restraint system according to the invention, which is constructed as a head gas bag restraint system, in installed state.

DETAILED DESCRIPTION OF THE PREFERRED EMBODIMENTS

In FIG. 1, a head side gas bag restraint system for vehicle occupants is shown, which extends along the roof frame from laterally to the rear passenger to laterally to the front passenger. The restraint system comprises a receiving container 3, substantially U-shaped in cross-section, having an outer wall 5 by which the container 3 is secured to the roof frame, and having an inner wall 7 Lacing the passenger compartment in the installed state. The inner wall 7, viewed in cross-section, is shorter than the outer wall 5. Numerous flaps 11, arranged one after the other, are provided on the lower edge of the inner wall 7 by means of hinges 9 (cf. also FIG. 6). In FIG. 1 the flap 11 is shown in swung-open state, so that the container 3 is opened. At the upper end of the container 3 a folded head gas bag 13 is arranged, which is constructed as a so-called curtain and in the inflated state largely covers the side panes. Inside the gas bag, a so-called lance, 15 is provided, which extends almost over the entire length of the gas bag and which serves as a gas duct, so that the elongated gas bag is inflated not only from one end but rather is inflated uniformly approximately over its entire upper edge. For this, the lahce has numerous openings 17 on its lower edge.

Between the folded gas bag 13 and the hinge 9, a so-called ejection channel 19 is formed, The ejection channel 19 determines the unfolding direction of the gas bag 13 at the start of the inflation process.

The flap 11 is integrally connected with the inner wall 7, The hinge 9 is formed by the formation of a thin wall piece. The flap 11 is composed of several components, namely an elastically deformable base plate 21 on the inner face, of which also the inner and outer walls 5, 7 consist, and also of a further component, namely a plastically deformable layer 23 secured to the base plate 21. The layer 23 has an energy-absorbing, ribbed structure, as is illustrated in FIGS. 3 to 5 in various examples. The layer 23 has numerous ribs 25 which serve as a wall between enclosed cavities, of which the cavity 26 is indicated in FIG. 1, or recesses 27. The recesses 27 are open toward the exterior, more precisely to the exterior facing the passenger compartment. The layer 23 can be cross-ribbed (cf. FIG. 3), have hemispherical recesses 27 (cf. FIG. 4) or form a honeycomb structure (cf. FIG. 5). Of course, other structures are also possible. The ribs 25 are of a synthetic material which is easily deformable plastically. A thin covering 29 (of. FIG. 1) is glued or placed (e.g. by a clip-on connection) onto the layer 23 from the exterior, so that the recesses 27 are closed externally and as a whole a closed body is produced for energy absorption.

Snap-in connections 31 at the lower edge of each flap 11 and at the lower edge of the inner wall 5 serve for the closing of the container 3 by the flaps 11 being swung towards the outer wall 5 after placement of the lance 15 with the gas bag 13, and they remain secured to this outer wall 5. The snap-in connections 31 of course must be constructed such that on opening of the flaps 11 by the unfolding gas bag 13, they do not lead to the destruction of the gas bag 13 or influence the unfolding process.

In the embodiment shown in FIG. 2, the energy-absorbing structure of the flap 11 is achieved in that it is formed by injection-molding around a tubular hollow body 33 which is inserted. In FIG. 2 the roof frame 35 can also be seen, to which the outer wall 5 is secured. Otherwise, the same parts are also designated by the same reference numbers in the various figures.

A further possibility of forming the flap 11 as a hollow body consists for example in that it is produced by the so-called gas internal pressure method and thereby cavities are formed. Furthermore, for simplification, the gas bag 13 is not illustrated in FIG. 2.

After the insertion of the gas bag 13 together with the lance 15 and after the closing of the flaps 11, no further casing of the receiving container 3 is provided, as is the case in conventional containers hitherto. These are in fact usually welded into a foil so that the container always remains closed.

The advantage of the gas bag restraint system according to the invention consists in that both in the closed state and also in the opened state of the receiving container 3, head injuries by impact of the head on the container, in particular on the flap 11, can be reduced. The flap 11 is made to be energy-absorbing, by a few layers of ribs 25, so to speak, being plastically deformable, so that the head does not strike directly onto the roof frame 35. As the outer and inner walls 5, 7 are also made of flexible material, in particular of elastic plastics, the container yields so much on impact of the head, without breaking into individual parts, until in the extreme case the gas bag 13 is compressed and the inner wall 7 lies against the outer wall 5. Energy can also be reduced by the flexibility of the container itself.

The embodiment illustrated in FIG. 7 differs from that illustrated in FIG. 1 in that the layer 23 is not constructed as a separate part secured to the base plate 21. Rather, the entire container inclusive of the flap and the ribbed structure is designed in one piece. For the flap to also exhibit an energy absorbing capacity which is as high as possible, its orientation together with the orientation of its ribs relative to the direction of force introduction (illustrated by an arrow) on impact of the head is decisive. The base plate 21 extends substantially parallel to the direction of force introduction, and the ribs extend perpendicularly thereto, so as to allow them to be displaced into the recesses and cavities on force introduction. Of course, the base plate 21 is likewise plastically deformed on impact of the head.

In the embodiment illustrated in FIG. 7, the roof frame 35 is illustrated in more detail. So that the ejection channel 19 is aligned exactly to the side pane (not illustrated), numerous webs 37 are integrally formed with the outer wall 5, which are connected with each other by transverse webs 39. In the restraint systems known hitherto, a piece of shaped foam was always inserted in this region, which can now be eliminated. By the webs 37 and the transverse webs 39, closed-off cavities are produced in the installed state between the outer wall 5 and the roof frame 35, in which cavities the tips of the snap-in connections 31, which are torn off on opening of the flap 11, remain. The webs 37, 39 also absorb energy on impact of the occupant's head.

For an even greater amount of energy to be absorbed in the region of the webs 37 and the transverse webs 39, a hollow body in the form of an elongated tube is inserted in respective recesses in the webs 37, which constitute a clip-on connection. On displacement of the outer wall 5, the tube is deformed plastically, thus absorbing energy. It may also be exchanged via the clip-on connection. The tube itself is bent so as to match the profile of the roof frame 35. It is also possible to provide a tube corresponding to the tube 51 at the flap 11, for example by inserting it from below into respective recesses in the ribs.

What is claimed is:

1. A head side gas bag restraint system for occupants of a vehicle having a vehicle compartment, said system comprising;
   a gas bag;
   a receiving container for said gas bag, which container is to be secured to said vehicle;
   said receiving container having an outer wall, an inner wall facing said passenger compartment in an installed state of said system, and at least one flap which is integrally connected to said container, and which closes said container in a non-activated state of said system and which swings open in the case of activation of the gas bag; and
   an ejection channel for gas bag unfolding in the case of activation of the gas bag;
   said channel being formed between said outer and inner walls, said flap having structures arranged thereon; and
   said structures having recesses or cavities and are plastically deformed by an impact with an occupant's head.

2. The gas bag restraint system according to claim 1, wherein said structures are formed integrally with said flap.

3. The gas bag restraint system according to claim 1, wherein said structures include ribs and wherein said recesses or cavities are provided between said ribs.

4. The gas bag restraint system according to claim 3, wherein said container has an interior and an exterior and wherein said recesses between said ribs are open toward at least one of said interior and exterior of said container.

5. The gas bag restraint system according to claim 1, wherein said flap includes a base plate connecting said outer and inner walls with each other in the closed state of said container, and ribs projecting from said base plate substantially at a right angle.

6. The gas bag restraint system according to claim 3, wherein when said restraint system is in the installed state, said flap of said closed container extends approximately horizontally and connects said inner and outer walls with each other, and wherein said ribs extend substantially vertically.

7. The gas bag restraint system according to claim 1, wherein a cavity is formed by injection-molding around an inserted hollow body.

8. The gas bag restraint system according to claim 1, wherein said flap is integrally formed with said inner wall.

9. The gas bag restraint system according to claim 1, wherein said flap has a multi-component structure.

10. The gas bag restraint system according to claim 1, wherein webs are integrally formed on an outer face of said outer wall, said container lying against said vehicle via said webs.

11. The gas bag restraint system according to claim 10, wherein at least one hollow body is inserted in said webs for stabilizing said outer wall.

12. The gas bag restraint system according to claim 11, wherein said hollow body is arranged parallel to the longitudinal extent of said container and is releasably secured to said webs via a clip-on connection.

13. A head side gas bag restraint system for occupants of a vehicle having a vehicle compartment, said system comprising:
    a gas bag;
    a receiving container for said gas bag, which container is to be secured to said vehicle;
    said receiving container having an outer wall, an inner wall facing said passenger compartment in an installed state of said system, and at least one flap which closes said container in a non-activated state of said system and which swings open in the case of activation of the gas bag; and
    an ejection channel for gas bag unfolding in the case of activation of the gas bag;
    said channel being formed between said outer and inner walls, said flap having structures arranged thereon; and
    said structures having recesses or cavities and are plastically deformed by an impact with an occupant's head, said inner wall yielding in a manner deforming elastically or plastically up to abutment against said outer wall.

14. The gas bag restraint system according to claim 13, wherein said structures are formed integrally with said flap.

15. The gas bag restraint system according to claim 13, wherein said structures include ribs and wherein said recesses or said cavities are provided between said ribs.

16. The gas bag restraint system according to claim 15, wherein when said restraint system is in the installed state, said flap of said closed container extends approximately horizontally and connects said inner and outer walls with each other, and wherein said ribs extend substantially vertically.

17. The gas bag restraint system according to claim 13, wherein said flap is integrally formed with said inner wall.

18. The gas bag restraint system according to claim 13, wherein said flap has a multi-component structure.

19. The gas bag restraint system according to claim 13, wherein a plurality of flaps are provided along said container, arranged one after the other.

20. The gas bag restraint system according to claim 13, wherein webs are integrally formed on an outer face of said outer wall, said container lying against said vehicle via said webs.

21. The gas bag restraint system according to claim 20, wherein at least one hollow body is inserted in said webs for stabilizing said outer wall.

22. The gas bag restraint system according to claim 21, wherein said hollow body is arranged parallel to the longitudinal extent of said container and is releasably secured to said webs via a clip-on connection.

23. A head side gas bag restraint system for occupants of a vehicle having a vehicle compartment, said system comprising:
    a gas bag;
    a receiving container for said gas bag, which container is to be secured to said vehicle;
    said receiving container having an outer wall, an inner wall facing said passenger compartment in an installed state of said system, and at least one flap which closes said container in a non-activated state of said system and which swings open in the case of activation of the gas bag; and
    an ejection channel for gas bag unfolding in the case of activation of the gas bag;
    said channel being formed between said outer and inner walls, said flap having structures arranged thereon; and
    said structures having recesses or cavities and are plastically deformed by an impact with an occupant's head, wherein a plurality of flaps with said structures are provided along said container, arranged one after the other.

24. The gas bag restraint system according to claim 23, wherein said structures are formed integrally with said flaps.

25. The gas bag restraint system according to claim 23, wherein said structures include ribs and wherein said recesses or cavities are provided between said ribs.

26. The gas bag restraint system according to claim 25, wherein when said restraint system is in the installed state, said flaps of said closed container extend approximately horizontally and connects said inner and outer walls with each other, and wherein said ribs extend substantially vertically.

27. The gas bag restraint system according to claim 23, wherein said flaps are integrally formed with said inner wall.

28. The gas bag restraint system according to claim 23, wherein said flaps have a multi-component structure.

* * * * *

UNITED STATES PATENT AND TRADEMARK OFFICE
CERTIFICATE OF CORRECTION

PATENT NO. : 6,170,861 B1
DATED : January 9, 2001
INVENTOR(S) : Hans-Joachim Tietze It is certified that error appears in the above-identified patent and that said Letters Patent is hereby corrected as shown below:

<u>Title page,</u>
Item [30], Foreign Application Priority Data, change "September 13, 1997" to -- September 18, 1997 --.

Signed and Sealed this

Ninth Day of April, 2002

Attest:

Attesting Officer

JAMES E. ROGAN
*Director of the United States Patent and Trademark Office*